United States Patent
Lee et al.

(10) Patent No.: US 9,286,888 B1
(45) Date of Patent: Mar. 15, 2016

(54) SPEECH RECOGNITION SYSTEM AND SPEECH RECOGNITION METHOD

(71) Applicant: Hyundai Motor Company, Seoul (KR)

(72) Inventors: Chang Heon Lee, Gyeonggi-do (KR); Kyuseop Bang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/745,645

(22) Filed: Jun. 22, 2015

(30) Foreign Application Priority Data

Nov. 13, 2014 (KR) .......... 10-2014-0158158

(51) Int. Cl.
| | |
|---|---|
| *G10L 15/04* | (2013.01) |
| *G10L 15/06* | (2013.01) |
| *G10L 15/02* | (2006.01) |
| *G10L 17/22* | (2013.01) |
| *G10L 15/00* | (2013.01) |

(52) U.S. Cl.
CPC .............. *G10L 15/06* (2013.01); *G10L 15/02* (2013.01); *G10L 17/22* (2013.01)

(58) Field of Classification Search
CPC ......... G10L 15/06; G10L 15/02; G10L 15/22; G10L 15/005; G10L 15/01; G10L 15/04; G10L 15/24
USPC .......................... 704/231, 246, 248, 251, 253
See application file for complete search history.

(56) References Cited

FOREIGN PATENT DOCUMENTS

| | | |
|---|---|---|
| JP | 2006-010739 A | 1/2006 |
| JP | 2010-097073 A | 4/2010 |
| KR | 10-1999-0056308 A | 7/1999 |
| KR | 10-2005-0080649 A | 8/2005 |
| KR | 2012-0042090 A | 5/2012 |

*Primary Examiner* — Thierry L Pham
(74) *Attorney, Agent, or Firm* — Mintz Levin Cohn Ferris Glovsky and Popeo, P.C.; Peter F. Corless (57) ABSTRACT

A speech recognition system includes: a context storage medium storing a monosyllabic command context including a plurality of monosyllabic commands and storing a polysyllabic command context including a plurality of polysyllabic commands; a speech segment detector detecting a speech segment having a start point and an end point by analyzing a speech signal within the speech segment; a syllable determiner configured determining whether the speech signal corresponds to a monosyllabic form or a polysyllabic form; a feature vector extractor extracting a feature vector by analyzing the speech signal; and a speech recognizer selecting one of the monosyllabic command context and the polysyllabic command context according to the determination of whether the speech signal corresponds to the monosyllabic form or the polysyllabic form and recognizing at least one command in the selected one of the monosyllabic command context and the polysyllabic command context based on the extracted feature vector.

19 Claims, 5 Drawing Sheets

SPEECH RECOGNITION SYSTEM AND SPEECH RECOGNITION METHOD

CROSS-REFERENCE TO RELATED APPLICATION

This application claims priority to and the benefit of Korean Patent Application No. 10-2014-0158158 filed in the Korean Intellectual Property Office on Nov. 13, 2014, the entire contents of which are incorporated herein by reference.

BACKGROUND OF THE DISCLOSURE (a) Technical Field

The present disclosure relates to a speech recognition system and a speech recognition method.

(b) Description of the Related Art

A human-machine interface (HMI) interfaces a user with a machine through visual sensation, auditory sensation, or tactile sensation. Attempts have been made to use speech recognition as the HMI within a vehicle in order to minimize diversion of a driver's attention and to improve convenience.

Commands that a speech recognition system in a vehicle may recognize can include monosyllabic commands and polysyllabic commands. A monosyllabic command means a word formed with one syllable (e.g., "Mom", "Home") or a word formed with one diphthong (e.g., "Joy"). Since a monosyllabic command does not have information sufficient to recognize speech, speech recognition performance of the monosyllabic command is degraded as compared to speech recognition performance of a polysyllabic command.

Furthermore, in a noisy environment of the vehicle, deterioration of the speech recognition performance becomes more serious. Since it is not determined whether a speech signal corresponds to a monosyllabic command in the case of a conventional speech recognition system, it can be difficult to apply a speech recognition method that specializes in monosyllabic commands.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The present disclosure has been made in an effort to provide a speech recognition system and a speech recognition method having advantages of improving recognition performance for a speech signal having a monosyllabic form.

A speech recognition system according to embodiments of the present disclosure includes: a context storage medium storing a monosyllabic command context including a plurality of monosyllabic commands and storing a polysyllabic command context including a plurality of polysyllabic commands; a speech segment detector detecting a speech segment having a start point and an end point by analyzing a speech signal within the speech segment; a syllable determiner configured determining whether the speech signal corresponds to a monosyllabic form or a polysyllabic form; a feature vector extractor extracting a feature vector by analyzing the speech signal; and a speech recognizer selecting one of the monosyllabic command context and the polysyllabic command context according to the determination of whether the speech signal corresponds to the monosyllabic form or the polysyllabic form and recognizing at least one command in the selected one of the monosyllabic command context and the polysyllabic command context based on the extracted feature vector.

The syllable determiner may include: a vowel/consonant detector detecting a vowel and a consonant from the speech signal; a combination calculator calculating a number of combinations of the vowel and the consonant; and a comparator comparing the number of combinations to a predetermined number.

The vowel/consonant detector may detect the vowel and the consonant using at least one of an energy of the speech signal, a zero crossing rate of the speech signal, an autocorrelation function of the speech signal, a fundamental frequency of the speech signal, and a spectral tilt of the speech signal.

The speech recognition system may further include an acoustic model storage medium storing an acoustic model which is used for speech recognition, wherein when the syllable determiner determines that the speech signal corresponds to the monosyllabic form, the speech recognizer may recognize at least one command based on the extracted feature vector using the monosyllabic command context and the acoustic model, and when the syllable determiner determines that the speech signal corresponds to the polysyllabic form, the speech recognizer may recognize at least one command based on the extracted feature vector using the polysyllabic command context and the acoustic model.

The speech recognition system may further include: an acoustic model storage medium storing an acoustic model which is used for speech recognition; and a recognition result processor executing a function corresponding to the recognized command.

Furthermore, according to embodiments of the present disclosure, a speech recognition system includes: a context storage medium storing a monosyllabic command context including a plurality of monosyllabic commands and storing a polysyllabic command context including a plurality of polysyllabic commands; a speech segment detector detecting a speech segment having a start point and an end point by analyzing a speech signal within the speech segment; a syllable determiner determining whether the speech signal corresponds to a monosyllabic form or a polysyllabic form; a feature vector extractor extracting a feature vector by analyzing the speech signal; a speech recognizer calculating initial confidence scores of respective monosyllabic commands and initial confidence scores of respective polysyllabic commands based on the extracted feature vector; a weight value setter setting a first weight value which is to be applied to the initial confidence scores of the respective monosyllabic commands and a second weight value which is to be applied to the initial confidence scores of the respective polysyllabic commands according to the determination of whether the speech signal corresponds to the monosyllabic form or the polysyllabic form; and a weight value applier calculating final confidence scores of the respective monosyllabic commands by applying the first weight value to the initial confidence scores of the respective monosyllabic commands and calculating final confidence scores of the respective polysyllabic commands by applying the second weight value to the initial confidence scores of the respective polysyllabic commands.

The syllable determiner may include: a vowel/consonant detector detecting a vowel and a consonant from the speech signal; a combination calculator calculating a number of combinations of the vowel and the consonant; and a comparator comparing the number of combinations to a predetermined number.

The vowel/consonant detector may detect the vowel and the consonant using at least one of an energy of the speech signal, a zero crossing rate of the speech signal, an auto-correlation function of the speech signal, a fundamental frequency of the speech signal, and a spectral tilt of the speech signal.

The speech recognition system may further include a recognition result processor selecting a command with a highest final confidence score based on the final confidence scores of the respective monosyllabic commands and the final confidence scores of the respective polysyllabic commands.

When the syllable determiner determines that the speech signal corresponds to the monosyllabic form, the weight value setter may set the first weight value to be greater than the second weight value.

When the syllable determiner determines that the speech signal corresponds to the polysyllabic form, the weight value setter may set the second weight value to be greater than the first weight value.

Furthermore, according to embodiments of the present disclosure, a recognition method includes: detecting a speech segment having a start point and an end point by analyzing a speech signal within the speech segment; determining whether the speech signal corresponds to a monosyllabic form or a polysyllabic form; extracting a feature vector by analyzing the speech signal; selecting a monosyllabic command context including a plurality of monosyllabic commands and recognizing at least one command based on the extracted feature vector using the monosyllabic command context, when the speech signal corresponds to the monosyllabic form; and selecting a polysyllabic command context including a plurality of polysyllabic commands and recognizing at least one command based on the extracted feature vector using the polysyllabic command context, when the speech signal corresponds to the polysyllabic form.

The determining of whether the speech signal corresponds to the monosyllabic form or the polysyllabic form may include: detecting a vowel and a consonant from the speech signal; calculating a number of combinations of the vowel and the consonant; and comparing the number of combinations to a predetermined number.

The detecting of the vowel and the consonant from the speech signal may include: detecting the vowel and the consonant using at least one of an energy of the speech signal, a zero crossing rate of the speech signal, an auto-correlation function of the speech signal, a fundamental frequency of the speech signal, and a spectral tilt of the speech signal.

Furthermore, according to embodiments of the present disclosure, a speech recognition method includes: detecting a speech segment having a start point and an end point by analyzing a speech signal within the speech segment; determining whether the speech signal corresponds to a monosyllabic form or a polysyllabic form; extracting a feature vector by analyzing the speech signal; calculating initial confidence scores of respective monosyllabic commands included in a monosyllabic command context and initial confidence scores of respective polysyllabic commands included in a polysyllabic command context based on the extracted feature vector; setting a first weight value which is to be applied to the initial confidence scores of the respective monosyllabic commands and a second weight value which is to be applied to the initial confidence scores of the respective polysyllabic commands according to the determination of whether the speech signal corresponds to the monosyllabic form or the polysyllabic form; and calculating final confidence scores of the respective monosyllabic commands by applying the first weight value to the initial confidence scores of the respective monosyllabic commands and final confidence scores of the respective polysyllabic commands by applying the second weight value to the initial confidence scores of the respective polysyllabic commands.

The determining of whether the speech signal corresponds to the monosyllabic form or the polysyllabic form may include: detecting a vowel and a consonant from the speech signal; calculating the number of combinations of the vowel and the consonant; and comparing the number of combinations to a predetermined number.

The detecting of the vowel and the consonant from the speech signal may include detecting the vowel and the consonant using at least one of an energy of the speech signal, a zero crossing rate of the speech signal, an auto-correlation function of the speech signal, a fundamental frequency of the speech signal, and a spectral tilt of the speech signal.

The speech recognition method may further include selecting a command with a highest final confidence score based on the final confidence scores of the respective monosyllabic commands and the final confidence scores of the respective polysyllabic commands.

The setting of the first weight value and the second weight value may include: setting the first weight value to be greater than the second weight value when the speech signal corresponds to the monosyllabic form; and setting the second weight value to be greater than the first weight value when the speech signal corresponds to the polysyllabic form.

| <Description of symbols> | | | |
|---|---|---|---|
| 110: | context storage medium context | 111: | monosyllabic command |
| 112: | polysyllabic command context medium | 120: | acoustic model storage |
| 130: | speech segment detector | 140: | syllable determiner |
| 141: | vowel/consonant detector | 142: | combination calculator |
| 143: | comparator | 150: | feature vector extractor |
| 160: | speech recognizer processor | 170: | recognition result |
| 210: | context storage medium context | 211: | monosyllabic command |
| 212: | polysyllabic command context medium | 220: | acoustic model storage |
| 230: | speech segment detector | 240: | syllable determiner |
| 250: | feature vector detector | 260: | speech recognizer |
| 270: | recognition result processor | 280: | weight value setter |
| 290: | weight value applier | | |

DETAILED DESCRIPTION OF THE EMBODIMENTS

The present disclosure will be described in detail hereinafter with reference to the accompanying drawings. However, the present disclosure is not limited to embodiments described herein, and may be embodied in other forms. Parts that are irrelevant to the description will be omitted to clearly describe the present disclosure, and the same or similar constituent elements will be designated by the same or similar reference numerals throughout the specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Hereinafter, referring to FIG. 1 to FIG. 3, a speech recognition system and a speech recognition method according to a first exemplary embodiment of the present disclosure will be described in detail.

Figure 1:
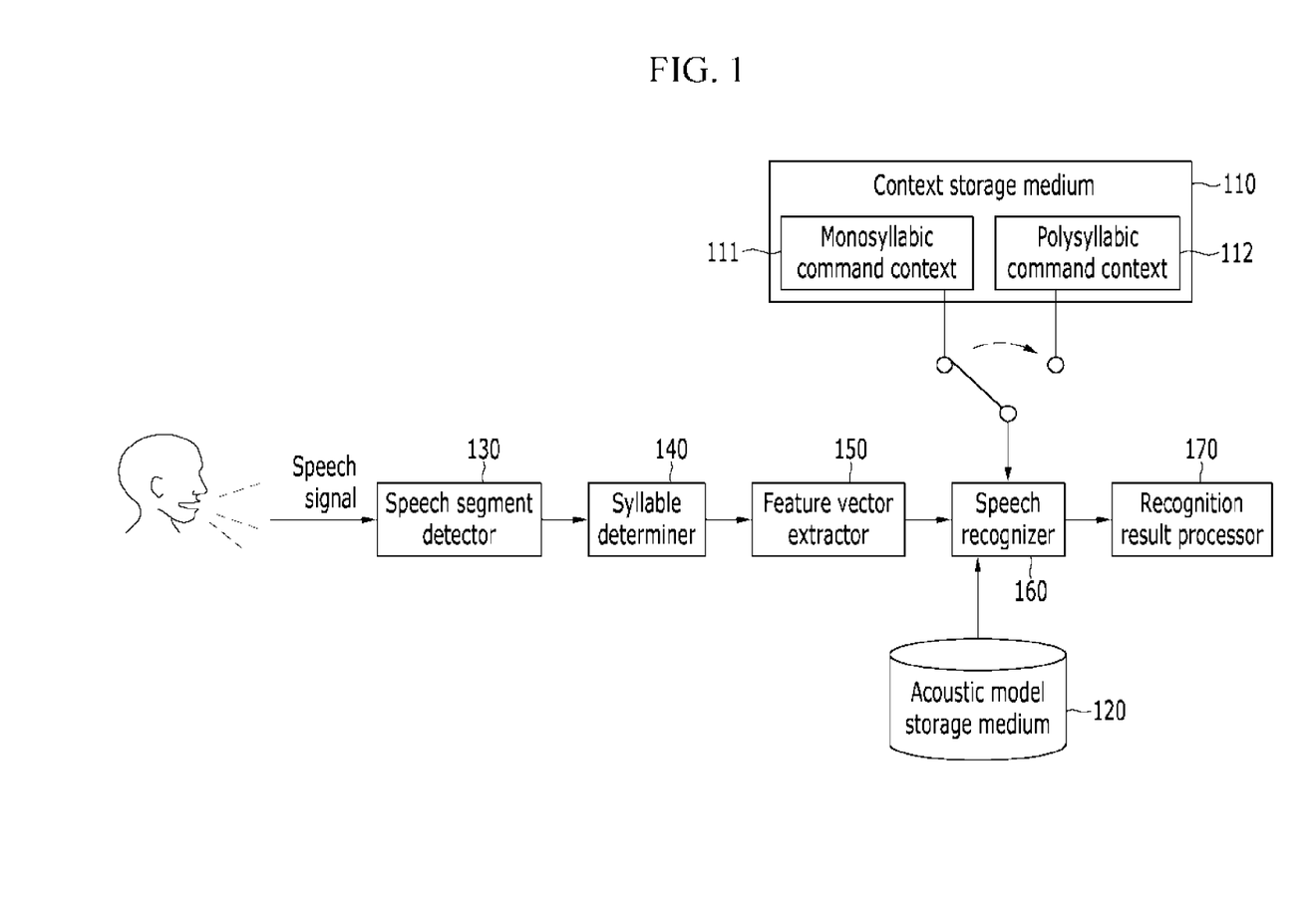
FIG. 1 is a block diagram of the speech recognition system according to a first exemplary embodiment of the present disclosure.
Figure 2:
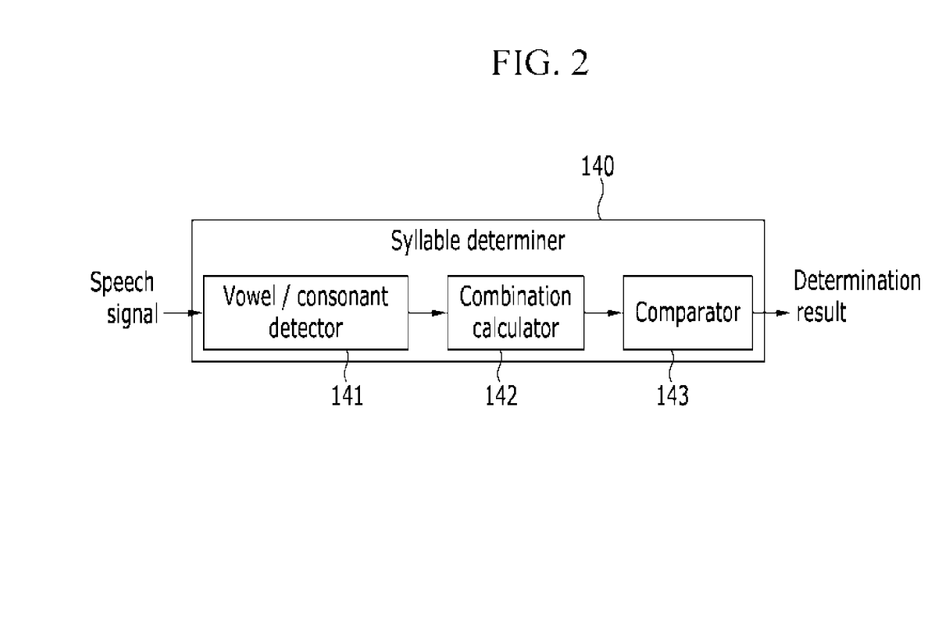
FIG. 2 is a block diagram of a syllable determiner according to the first exemplary embodiment of the present disclosure.

FIG. 1 is a block diagram of the speech recognition system according to the first exemplary embodiment of the present disclosure, and FIG. 2 is a block diagram of a syllable determiner according to the first exemplary embodiment of the present disclosure.

As shown in FIG. 1, the speech recognition system according to the first exemplary embodiment of the present disclosure includes a context storage medium 110, an acoustic model storage medium 120, a speech segment detector 130, a syllable determiner 140, a feature vector extractor 150, a speech recognizer 160, and a recognition result processor 170. When the constituent elements are implemented in actual application, two or more constituent elements may be integrated into one constituent element, or one constituent element may be subdivided into two or more constituent elements if necessary for configuration.

The context storage medium 110 may store commands, which are references for recognizing speech, as context information. The context storage medium 110 may store a monosyllabic command context 111 and a polysyllabic command context 112. The monosyllabic command context 111 may include a plurality of monosyllabic commands which are references for recognizing speech having a monosyllabic form (e.g., "Mom", "Home", and "Call"). Each of the plurality of monosyllabic commands includes one syllable or one diphthong. The polysyllabic command context 112 may include a plurality of polysyllabic commands which are references for recognizing speech having a polysyllabic form (e.g., "Find address", "Radio", and "Play music"). Each of the plurality of polysyllabic commands includes a plurality of syllables or a plurality of diphthongs.

The acoustic model storage medium 120 stores an acoustic model which is used for speech recognition. The acoustic model is used to represent properties of the speech. The acoustic model is obvious to a person of ordinary skill in the art, and thus detailed description thereof will be omitted. Although FIG. 1 exemplarily illustrates that the context storage medium 110 and the acoustic model storage medium 120 are realized as two storage mediums, embodiments of the present disclosure are not limited thereto. According to some embodiments of the present disclosure, the context storage medium 110 and the acoustic model storage medium 120 may be realized as one storage medium.

The speech segment detector 130 detects a speech segment having a start point and an end point by analyzing a speech signal received via a sound input means such as a microphone. The speech recognition system according to the first exemplary embodiment of the present disclosure may further include a preprocessor (not shown) configured to remove a noise component of the speech signal before the speech signal is input to the speech segment detector 130. If the speech segment is detected by the speech segment detector 130, the syllable determiner 140 may determine whether the speech signal within the speech segment corresponds to the monosyllabic form or the polysyllabic form by analyzing the speech signal.

As shown in FIG. 2, the syllable determiner 140 according to the first exemplary embodiment of the present disclosure may include a vowel/consonant detector 141, a combination calculator 142, and a comparator 143.

The vowel/consonant detector 141 detects a vowel and a consonant by analyzing the speech signal within the speech segment with respect to pronunciation. The vowel/consonant detector 141 may detect the vowel and the consonant by using energy, a zero crossing rate, an auto-correlation function, a fundamental frequency, and a spectral tilt of the speech signal. The vowel has relatively high energy in comparison with the consonant, and the zero crossing rate of the vowel is lower than that of the consonant. In addition, the auto-correlation function of the vowel has a periodical characteristic, a band (e.g., about 80 to 260 Hz) of the fundamental frequency of the vowel is limited in comparison with the consonant, and the spectral tilt of the vowel is greater than that of the consonant.

The comparison calculator 142 calculates the number of combinations of the vowel and the consonant based on the detection result of the vowel/consonant detector 141.

The comparator 143 may determine whether the speech signal within the speech segment corresponds to the monosyllabic form or the polysyllabic form based on the number of combinations of the vowel and the consonant calculated by the combination calculator 142. In particular, the comparator 143 may compare the number of combinations with a predetermined number. The predetermined number may be set to a value which is determined by a person of ordinary skill in the art to determine whether the speech signal correspond to the monosyllabic form. If the number of combinations calculated by the combination calculator 142 is less than the predetermined number, the comparator 143 may determine that the speech signal within the speech segment corresponds to the monosyllabic form. If the number of combinations calculated by the combination calculator 142 is greater than or equal to the predetermined number, the comparator 143 may determine that the speech signal within the speech segment corresponds to the polysyllabic form.

The feature vector extractor 150 extracts a feature vector by analyzing the speech signal detected by the speech segment detector 130. When the feature vector extractor 150 extracts the feature vector, the speech recognizer 160 recognizes at least one command using the feature vector based on the acoustic model stored in the acoustic model storage medium 120 and the context information stored in the context storage medium 110. In addition, the speech recognizer 160 may calculate a confidence score that represents speech recognition confidence of respective commands.

The speech recognizer 160 may select one of the monosyllabic command context 111 and the polysyllabic command context 112 according to the determination result of the syllable determiner 140. If the syllable determiner 140 determines that the speech signal corresponds to the monosyllabic form, the speech recognizer 160 may select the monosyllabic command context 111 to perform the speech recognition. If the syllable determiner 140 determines that the speech signal corresponds to the polysyllabic form, the speech recognizer 160 may select the polysyllabic command context 112 to perform the speech recognition.

The recognition result processor 170 receives the speech recognition result from the speech recognizer 160 to process the speech recognition result. For example, the recognition result processor 170 may arrange the commands recognized by the speech recognizer 160 in a descending order of the confidence score, may display the arranged commands via a display device, and may execute a function (e.g., a call function or a route guidance function) corresponding to the recognized command.

Figure 3:
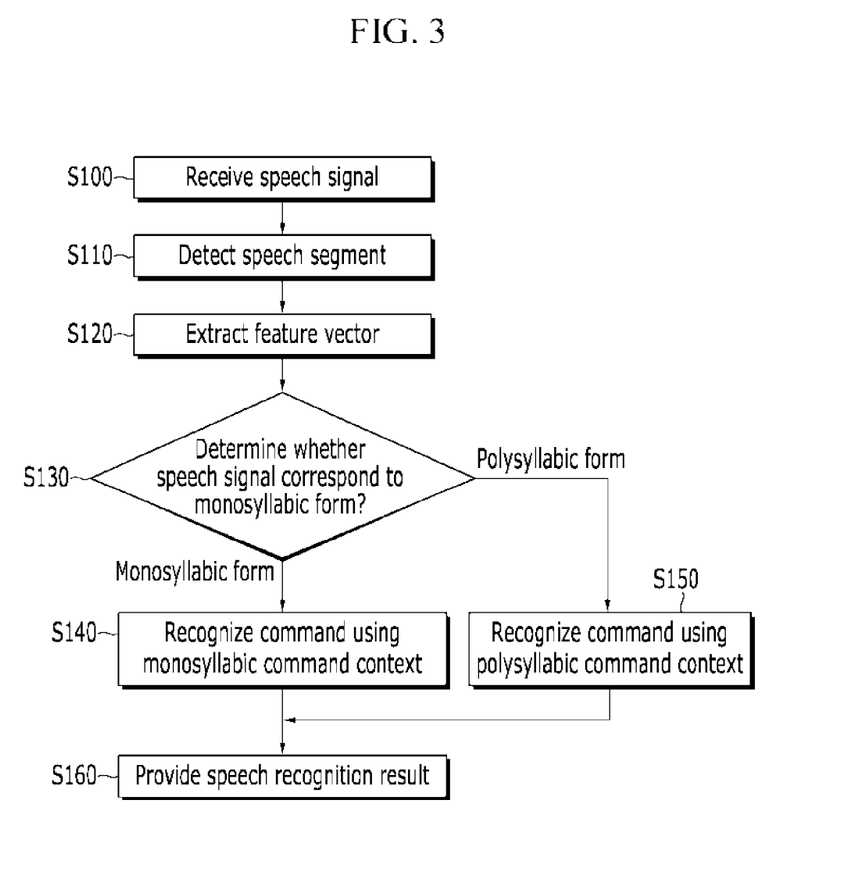
FIG. 3 is a flowchart of a speech recognition method according to the first exemplary embodiment of the present disclosure.

FIG. 3 is a flowchart of the speech recognition method according to the first exemplary embodiment of the present disclosure.

As shown in FIG. 3, the speech segment detector 130 receives the speech signal via the sound input means such as the microphone at step S100, and detects the speech segment having the start point and the end point by analyzing the speech signal at step S110.

The feature vector extractor 150 extracts the feature vector by analyzing the speech signal detected by the speech segment detector 130 at step S120, and transmits the feature vector to the speech recognizer 160.

The syllable determiner 140 determines whether the speech signal corresponds to the monosyllabic form or the polysyllabic from at step S130. The syllable determiner 140 may detect the vowel and the consonant by analyzing the speech signal within the speech segment, may calculate the number of combinations of the vowel and the consonant, and may determine whether the speech signal corresponds to the monosyllabic form or the polysyllabic form according to the number of combinations.

If the speech signal corresponds to the monosyllabic form at step S130, the speech recognizer 160 may select the monosyllabic command context 111. In this case, the speech recognizer 160 may recognize at least one command based on the extracted feature vector by using the monosyllabic command context 111 and the acoustic model stored in the acoustic model storage medium 120 at step S140.

On the contrary, if the speech signal corresponds to the polysyllabic form at step S130, the speech recognizer 160 may select the polysyllabic command context 112. In this case, the speech recognizer 160 may recognize at least one command based on the extracted feature vector by using the polysyllabic command context 112 and the acoustic model stored in the acoustic model storage medium 120 at step S150.

When the speech recognition is successfully performed at step S140 or S150, the recognition result processor 170 may display at least one command recognized by the speech recognizer 160 via the display device, or may provide the speech recognition result to a user such as a driver by executing a function corresponding to the recognized command at step S160.

As described above, the speech recognition system according to the first exemplary embodiment of the present disclosure determines whether the speech signal within the speech segment corresponds to the monosyllabic form before performing speech recognition, and performs the speech recognition using the monosyllabic command context 111 if the speech signal is determined to correspond to the monosyllabic form. Accordingly, a speech recognition success rate of a monosyllabic command may be improved, thereby minimizing diversion of a driver's attention caused by speech recognition failure.

Hereinafter, referring to FIG. 4 and FIG. 5, a speech recognition system and a speech recognition method according to a second exemplary embodiment of the present disclosure will be described in detail.

Figure 4:
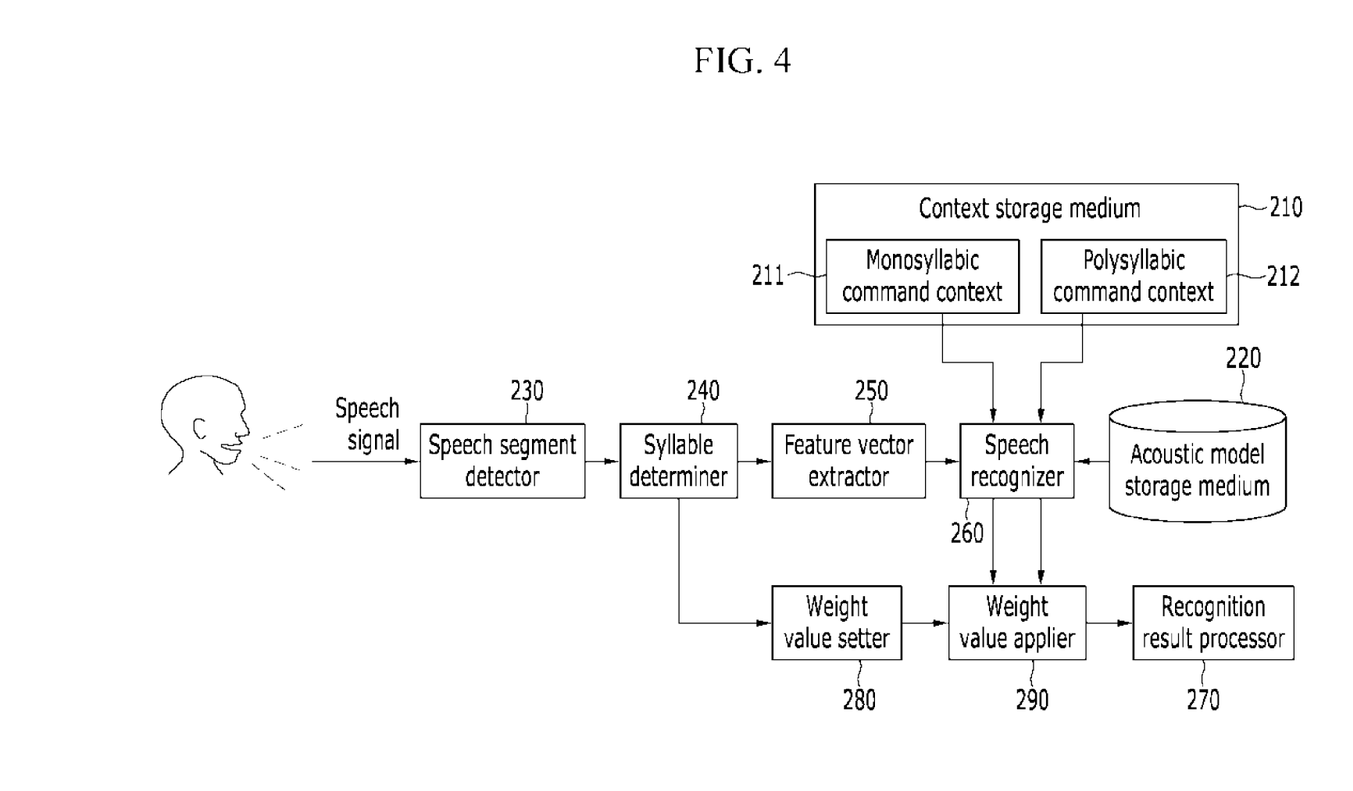
FIG. 4 is a block diagram of a speech recognition system according to a second exemplary embodiment of the present disclosure.

FIG. 4 is a block diagram of the speech recognition system according to the second exemplary embodiment of the present disclosure.

As shown in FIG. 4, the speech recognition system according to the second exemplary embodiment of the present disclosure includes a context storage medium 210, an acoustic model storage medium 220, a speech segment detector 230, a syllable determiner 240, a feature vector extractor 250, a speech recognizer 260, and a recognition result processor 270. The speech recognition system according to the second exemplary embodiment of the present disclosure is similar to the speech recognition system according to the first exemplary embodiment of the present disclosure except that a weight value setter 280 and a weight value applier 290 are further included. When the constituent elements are implemented in actual application, two or more constituent elements may be integrated into one constituent element, or one constituent element may be subdivided into two or more constituent elements if necessary for configuration.

Hereinafter, among constituent elements of the speech recognition system according to the second exemplary embodiment of the present disclosure, the detailed description of the same or similar constituent elements as those of the speech recognition system according to the first exemplary embodiment of the present invention will be omitted.

The context storage medium 210 may store commands, which are references for recognizing speech, as context information. The context storage medium 210 may store a monosyllabic command context 211 and a polysyllabic command context 212. The monosyllabic command context 211 may store a plurality of monosyllabic commands which are references for recognizing speech having a monosyllabic form. Each of the plurality of monosyllabic commands includes one syllable or one diphthong. The polysyllabic command context 212 may store a plurality of polysyllabic commands which are references for recognizing speech having a polysyllabic form. Each of the plurality of polysyllabic commands includes a plurality of syllables or a plurality of diphthongs.

The acoustic model storage medium 220 stores an acoustic model which is used for speech recognition. The acoustic model is used to represent properties of the speech. The acoustic model is obvious to a person of ordinary skill in the art, and thus detailed description thereof will be omitted. Although FIG. 4 exemplarily illustrates that the context storage medium 210 and the acoustic model storage medium 220 are realized as two storage mediums, embodiments of the present disclosure are not limited thereto. According to some embodiments of the present disclosure, the context storage medium 210 and the acoustic model storage medium 220 may be realized as one storage medium.

The speech segment detector 230 detects a speech segment having a start point and an end point by analyzing a speech signal received via a sound input means such as a microphone. The speech recognition system according to the second exemplary embodiment of the present disclosure may further include a preprocessor (not shown) configured to remove a noise component of the speech signal before the speech signal is input to the speech segment detector 230.

If the speech segment is detected by the speech segment detector 230, the syllable determiner 240 may determine whether the speech signal within the speech segment corresponds to the monosyllabic form or the polysyllabic form by analyzing the speech signal. The syllable determiner 240 may detect a vowel and a consonant by analyzing the speech signal within the speech segment. The syllable determiner 240 may determine whether the speech signal within the speech segment corresponds to the monosyllabic form or the polysyllabic form based on the number of combinations of the vowel and the consonant. If the number of combinations is less than a predetermined number, the syllable determiner 240 may determine that the speech signal corresponds to the monosyllabic form.

The feature vector extractor 250 extracts a feature vector by analyzing the speech signal detected by the speech segment detector 230. When the feature vector extractor 250 extracts the feature vector, the speech recognizer 260 recognizes at least one command from the feature vector.

The speech recognizer 260 may calculate initial confidence scores of respective monosyllabic commands stored in the monosyllabic command context 211 based on the extracted feature vector and the acoustic model. In addition, the speech recognizer 260 may calculate initial confidence scores of respective polysyllabic commands stored in the polysyllabic command context 212 based on the extracted feature vector and the acoustic model. The initial confidence scores of the respective monosyllabic commands and the initial confidence scores of the respective polysyllabic commands may be transmitted from the speech recognizer 260 to the weight value applier 290. The weight value setter 280 sets weight values to be applied to the initial confidence scores according to the determination result of the syllable determiner 240.

If the syllable determiner 240 determines that the speech signal within the speech segment corresponds to the monosyllabic form, the weight value setter 280 may set a first weight value, which is to be applied to the initial confidence scores of the respective monosyllabic commands, to be greater than a second weight value which is to be applied to the initial confidence scores of the respective polysyllabic commands. For example, the first weight value may be set to a value K between 0.5 and 1.0 (i.e., 0.5<K<1.0), and the second weight value may be set to a value 1-K.

On the contrary, if the syllable determiner 240 determines that the speech signal within the speech segment corresponds to the polysyllabic form, the weight value setter 280 may set the second weight value, which is to be applied to the initial confidence scores of the respective polysyllabic commands, to be greater than the first weight value which is to be applied to the initial confidence scores of the respective monosyllabic commands. For example, the first weight value may be set to a value K between 0 and 0.5 (i.e., 0<K<0.5), and the second weight value may be set to a value 1-K.

If the initial confidence scores of the respective monosyllabic commands and the initial confidence scores of the respective polysyllabic commands are received from the speech recognizer 260, the weight value applier 290 may calculate final confidence scores by applying the weight values set by the weight value setter 280 to the initial confidence scores. That is, the weight value applier 290 may calculate the final confidence scores of the respective monosyllabic commands by multiplying the initial confidence scores of the respective monosyllabic commands and the first weight value (K), and the final confidence scores of the respective polysyllabic commands by multiplying the initial confidence scores of the respective polysyllabic commands and the second weight value (1-K).

The recognition result processor 270 provides a final speech recognition result to a user such as a driver based on the final confidence scores of the respective monosyllabic commands and the final confidence scores of the respective polysyllabic commands. The recognition result processor 270 may arrange the commands in a descending order of the final confidence scores, may display the arranged commands via a display device, and may select a command with the highest final confidence score by using an N-best selection method. The recognition result processor 270 may execute a function corresponding to the command with the highest final confidence score.

Figure 5:
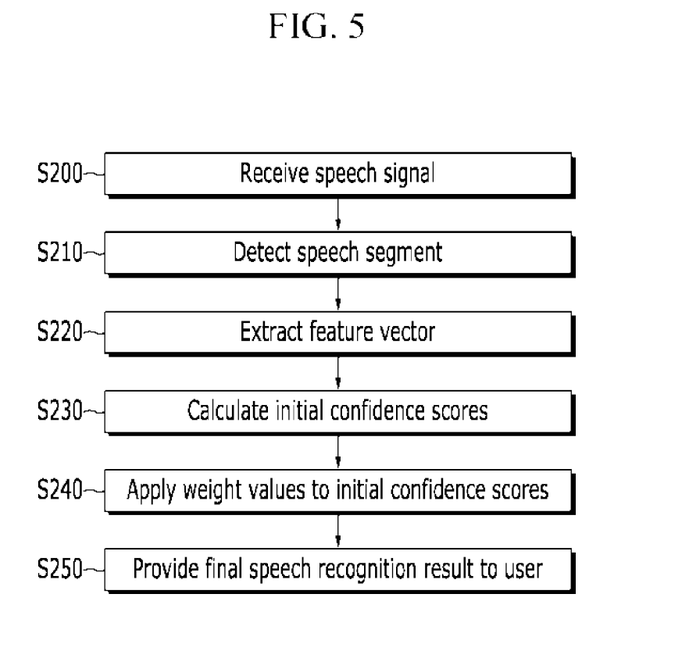
FIG. 5 is a flowchart of a speech recognition method according to the second exemplary embodiment of the present disclosure.

FIG. 5 is a flowchart of the speech recognition method according to the second exemplary embodiment of the present disclosure.

As shown in FIG. 5, the speech segment detector 230 receives the speech signal via the sound input means such as the microphone at step S200, and detects the speech segment having the start point and the end point by analyzing the speech signal at step S210.

The feature vector extractor 250 extracts the feature vector by analyzing the speech signal detected by the speech segment detector 230 at step S220, and transmits the feature vector to the speech recognizer 260.

When the feature vector extractor 250 extracts the feature vector, the speech recognizer 260 may calculate initial confidence scores based on the feature vector at step S230.

The speech recognizer 260 may calculate initial confidence scores of respective monosyllabic commands stored in the monosyllabic command context 211 based on the extracted feature vector and the acoustic model stored in the acoustic model storage medium 220. In addition, the speech recognizer 260 may calculate initial confidence scores of respective polysyllabic commands stored in the polysyllabic command context 212 based on the extracted feature vector and the acoustic model. The initial confidence scores of the respective monosyllabic commands and the initial confidence scores of the respective polysyllabic commands may be transmitted from the speech recognizer 260 to the weight value applier 290.

If the initial confidence scores of the respective monosyllabic commands and the initial confidence scores of the respective polysyllabic commands are received from the speech recognizer 260, the weight value applier 290 may calculate final confidence scores by applying weight values to the initial confidence scores at step S240.

The weight values applied to the initial confidence scores may be set by the weight value setter 280. The weight value setter 280 sets weight values to be applied to the initial confidence scores according to the determination result of the syllable determiner 240. If the syllable determiner 240 determines that the speech signal corresponds to the monosyllabic form, the weight value setter 280 may set the first weight value, which is to be applied to the initial confidence scores of the respective monosyllabic commands, to be greater than the second weight value which is to be applied to the initial confidence scores of the respective polysyllabic commands. On the contrary, if the syllable determiner 240 determines that the speech signal corresponds to the polysyllabic form the weight value setter 280 may set the second weight value, which is to be applied to the initial confidence scores of the respective polysyllabic commands, to be greater than the first weight value which is to be applied to the initial confidence scores of the respective monosyllabic commands.

The recognition result processor 270 provides the final speech recognition result to the user based on the final confidence scores of the respective monosyllabic commands and the final confidence scores of the respective polysyllabic commands at step S250. The recognition result processor 270 may arrange the commands in the descending order of the final confidence scores, and may select the command with the highest final confidence score by using the N-best selection method. The recognition result processor 270 may execute the function corresponding to the command with the highest final confidence score.

According to the first exemplary embodiment of the present disclosure described above, wrong context information may be used when an error occurs while determining syllabic form, and thus speech recognition performance may be deteriorated.

In contrast, according to the second exemplary embodiment of the present disclosure, in order to minimize deterioration of speech recognition performance due to the error, the weight values may be varied depending on the determination result the syllable determiner 240, and the final confidence scores may be calculated by applying the weight values to the initial confidence scores.

Constituent elements of the present disclosure may be code segments stored on a computer-readable recording medium. The computer-readable recording device may be a ROM, a RAM, a CD-ROM, a DVD_ROM, a DVD_RAM, a magnetic tape, a floppy disk, a hard disk, and an optical data storage device. Further, the computer-readable recording medium may store and execute codes that are divided on a computer connected to a network and can be divisionally read by a computer.

The drawings referred to above and the detailed description of the present disclosure, provided as examples of the present disclosure, are used to explain the present disclosure, without limiting meanings or the scope of the present disclosure described in claims. Therefore, those skilled in the art may easily implement modifications from those described above. Further, those skilled in the art may remove some of the constituent elements described herein without deterioration of the performance or may add other constituent elements to improve the performance. In addition, those skilled in the art may change the order of the processes of the method described herein, depending on the environment of the process or the equipment. Therefore, the scope of the present disclosure should be determined by not the embodiments described above, but by the claims and equivalents.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A speech recognition system comprising:
 a context storage medium storing a monosyllabic command context including a plurality of monosyllabic commands and storing a polysyllabic command context including a plurality of polysyllabic commands;
 a speech segment detector detecting a speech segment having a start point and an end point by analyzing a speech signal within the speech segment;
 a syllable determiner configured determining whether the speech signal corresponds to a monosyllabic form or a polysyllabic form;
 a feature vector extractor extracting a feature vector by analyzing the speech signal; and
 a speech recognizer selecting one of the monosyllabic command context and the polysyllabic command context according to the determination of whether the speech signal corresponds to the monosyllabic form or the polysyllabic form and recognizing at least one command in the selected one of the monosyllabic command context and the polysyllabic command context based on the extracted feature vector.

2. The speech recognition system of claim 1, wherein the syllable determiner includes:
 a vowel/consonant detector detecting a vowel and a consonant from the speech signal;
 a combination calculator calculating a number of combinations of the vowel and the consonant; and
 a comparator comparing the number of combinations to a predetermined number.

3. The speech recognition system of claim 2, wherein the vowel/consonant detector detects the vowel and the consonant using at least one of an energy of the speech signal, a zero crossing rate of the speech signal, an auto-correlation function of the speech signal, a fundamental frequency of the speech signal, and a spectral tilt of the speech signal.

4. The speech recognition system of claim 1, further comprising an acoustic model storage medium storing an acoustic model used for speech recognition, wherein
 when the syllable determiner determines that the speech signal corresponds to the monosyllabic form, the speech recognizer recognizes at least one command based on the extracted feature vector using the monosyllabic command context and the acoustic model, and
 when the syllable determiner determines that the speech signal corresponds to the polysyllabic form, the speech recognizer recognizes at least one command based on the extracted feature vector using the polysyllabic command context and the acoustic model.

5. The speech recognition system of claim 1, further comprising:
 an acoustic model storage medium storing an acoustic model used for speech recognition; and
 a recognition result processor executing a function corresponding to the at least one recognized command.

6. A speech recognition system comprising:
 a context storage medium storing a monosyllabic command context including a plurality of monosyllabic commands and storing a polysyllabic command context including a plurality of polysyllabic commands;
 a speech segment detector detecting a speech segment having a start point and an end point by analyzing a speech signal within the speech segment;

a syllable determiner determining whether the speech signal corresponds to a monosyllabic form or a polysyllabic form;

a feature vector extractor extracting a feature vector by analyzing the speech signal;

a speech recognizer calculating initial confidence scores of respective monosyllabic commands and initial confidence scores of respective polysyllabic commands based on the extracted feature vector;

a weight value setter setting a first weight value which is to be applied to the initial confidence scores of the respective monosyllabic commands and a second weight value which is to be applied to the initial confidence scores of the respective polysyllabic commands according to the determination of whether the speech signal corresponds to the monosyllabic form or the polysyllabic form; and a weight value applier calculating final confidence scores of the respective monosyllabic commands by applying the first weight value to the initial confidence scores of the respective monosyllabic commands and calculating final confidence scores of the respective polysyllabic commands by applying the second weight value to the initial confidence scores of the respective polysyllabic commands.

7. The speech recognition system of claim 6, wherein the syllable determiner includes:

a vowel/consonant detector detecting a vowel and a consonant from the speech signal;

a combination calculator calculating a number of combinations of the vowel and the consonant; and a comparator comparing the number of combinations to a predetermined number.

8. The speech recognition system of claim 7, wherein the vowel/consonant detector detects the vowel and the consonant using at least one of an energy of the speech signal, a zero crossing rate of the speech signal, an auto-correlation function of the speech signal, a fundamental frequency of the speech signal, and a spectral tilt of the speech signal.

9. The speech recognition system of claim 6, further comprising a recognition result processor selecting a command with a highest final confidence score based on the final confidence scores of the respective monosyllabic commands and the final confidence scores of the respective polysyllabic commands.

10. The speech recognition system of claim 6, wherein when the syllable determiner determines that the speech signal corresponds to the monosyllabic form, the weight value setter sets the first weight value to be greater than the second weight value.

11. The speech recognition system of claim 9, wherein when the syllable determiner determines that the speech signal corresponds to the polysyllabic form, the weight value setter sets the second weight value to be greater than the first weight value.

12. A recognition method comprising:

detecting a speech segment having a start point and an end point by analyzing a speech signal within the speech segment;

determining whether the speech signal corresponds to a monosyllabic form or a polysyllabic form;

extracting a feature vector by analyzing the speech signal;

selecting a monosyllabic command context including a plurality of monosyllabic commands and recognizing at least one command based on the extracted feature vector using the monosyllabic command context, when the speech signal corresponds to the monosyllabic form; and selecting a polysyllabic command context including a plurality of polysyllabic commands and recognizing at least one command based on the extracted feature vector using the polysyllabic command context, when the speech signal corresponds to the polysyllabic form.

13. The recognition method of claim 12, wherein the determining of whether the speech signal corresponds to the monosyllabic form or the polysyllabic form comprises:

detecting a vowel and a consonant from the speech signal;

calculating a number of combinations of the vowel and the consonant; and comparing the number of combinations to a predetermined number.

14. The speech recognition method of claim 13, wherein the detecting of the vowel and the consonant from the speech signal comprises:

detecting the vowel and the consonant using at least one of an energy of the speech signal, a zero crossing rate of the speech signal, an auto-correlation function of the speech signal, a fundamental frequency of the speech signal, and a spectral tilt of the speech signal.

15. A speech recognition method comprising:

detecting a speech segment having a start point and an end point by analyzing a speech signal within the speech segment;

determining whether the speech signal corresponds to a monosyllabic form or a polysyllabic form;

extracting a feature vector by analyzing the speech signal;

calculating initial confidence scores of respective monosyllabic commands included in a monosyllabic command context and initial confidence scores of respective polysyllabic commands included in a polysyllabic command context based on the extracted feature vector;

setting a first weight value which is to be applied to the initial confidence scores of the respective monosyllabic commands and a second weight value which is to be applied to the initial confidence scores of the respective polysyllabic commands according to the determination of whether the speech signal corresponds to the monosyllabic form or the polysyllabic form; and calculating final confidence scores of the respective monosyllabic commands by applying the first weight value to the initial confidence scores of the respective monosyllabic commands and final confidence scores of the respective polysyllabic commands by applying the second weight value to the initial confidence scores of the respective polysyllabic commands.

16. The speech recognition method of claim 15, wherein the determining of whether the speech signal corresponds to the monosyllabic form or the polysyllabic form comprises:

detecting a vowel and a consonant from the speech signal;

calculating a number of combinations of the vowel and the consonant; and comparing the number of combinations to a predetermined number.

17. The speech recognition method of claim 16, wherein the detecting of the vowel and the consonant from the speech signal comprises:

detecting the vowel and the consonant using at least one of an energy of the speech signal, a zero crossing rate of the speech signal, an auto-correlation function of the speech signal, a fundamental frequency of the speech signal, and a spectral tilt of the speech signal.

18. The speech recognition method of claim 15, further comprising selecting a command with a highest final confidence score based on the final confidence scores of the respective monosyllabic commands and the final confidence scores of the respective polysyllabic commands.

19. The speech recognition method of claim 15, wherein the setting of the first weight value and the second weight value comprises:
   setting the first weight value to be greater than the second weight value when the speech signal corresponds to the monosyllabic form; and
   setting the second weight value to be greater than the first weight value when the speech signal corresponds to the polysyllabic form.

* * * * *